000
United States Patent Office 3,632,763
Patented Jan. 4, 1972

3,632,763
4-AMINOFURO[2,3-d]PYRIMIDINES AS SMOOTH MUSCLE RELAXANTS
Hans-Jurgen E. Hess, Groton, and Timothy H. Cronin, Niantic, Conn., assignors to Pfizer Inc., New York, N.Y.
No Drawing. Original application Jan. 5, 1968, Ser. No. 695,868. Divided and this application Mar. 23, 1970, Ser. No. 22,053
Int. Cl. A61k 27/00
U.S. Cl. 424—251
12 Claims

ABSTRACT OF THE DISCLOSURE 4-aminofuro[2,3-d]pyrimidines relax smooth muscle and inhibit cyclic 3′,5′-nucleotide phosphodiesterase activity. The compounds are synthesized by condensing α-halo-ketone or aldehyde with dimethyl malonate, reacting the ethylene ketal malonamide thereof with alkanoic acid ester, cyclizing with acid to obtain the furo[2,3-d]pyrimidine-4-one, then obtaining a 4-amino derivative through the 4-chloro intermediate. The 5,6-alkylene compounds are prepared by condensing α-hydroxy cyclic ketone with malononitrile and cyclizing with alkanoic acid amide.

CROSS-REFERENCE TO RELATED APPLICATION

This is a division of application Ser. No. 695,868, filed Jan. 5, 1968.

BACKGROUND OF THE INVENTION

This invention relates to novel chemotherapeutic agents; in particular, it relates to certain 4-aminofuro[2,3-d]pyrinidines and the use thereof as smooth muscle relaxants.

Undesirable and excessive contraction of smooth muscle may result from a variety of causes and may manifest itself by various symptoms, e.g. bronchoconstriction and hypertension. The problem is relieved by different types of drugs according to its causation and location. The novel compounds of the instant invention have been found to be effective smooth muscle relaxants at least in part by means of their ability to affect the level of adenosine 3′,5′-monophosphate in smooth muscle tissue. This phenomenon is related to bronchodilation and hypotensive effects. K. Gewald, Chem. Ber. 99, 1002 (1966) discloses the synthesis of certain primary aminofuro[2,3-d] pyrimidines. However, the prior art does not teach that these compounds possess useful pharmaceutical activity.

SUMMARY OF THE INVENTION

This invention relates to compounds of the formulae

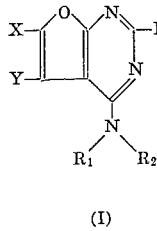
(I)

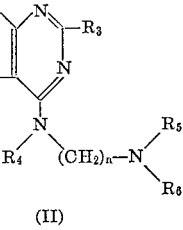
(II)

wherein

X and Y are each selected from the group consisting of hydrogen, alkyl containing up to 4 carbon atoms, phenyl, naphthyl and, X and Y taken together, alkylene containing between 4 and 6 carbon atoms and benzo;
$R_1$ and $R_2$ are each selected from the group consisting of hydrogen, alkyl containing up to 6 carbon atoms, alkenyl containing up to 6 carbon atoms, phenyl, naphthyl, β-hydroxyethyl, and $R_1$ and $R_2$, when taken together, form a heterocycle selected from the group consisting of morpholino, thiomorpholino and piperazino, wherein said piperazino is substituted at the 4-position with a moiety selected from the group consisting of hydrogen, alkyl containing up to 6 carbon atoms, alkenyl containing up to 6 carbon atoms, phenyl and naphthyl;
$R_3$ is hydrogen or alkyl containing up to 6 carbon atoms;
$R_4$, $R_5$ and $R_6$ are each selected from the group consisting of hydrogen and alkyl containing up to 6 carbon atoms; and
$n$ is an integer from 2 to 5.

These 4-aminofuro[2,3-d]pyrimidines, and the pharmaceutically-acceptable salts thereof, are effective in relaxing constricted smooth muscle, for example bronchial tissue, and for this purpose may be administered alone or in combination with a pharmaceutically-acceptable carrier. Especially effective are those compounds of Formula I.

Those compounds of Formula I wherein at least one of $R_1$ and $R_2$ is other than hydrogen, and compounds of Formula II are novel compounds.

DETAILED DESCRIPTION OF THE INVENTION

The furo[2,3-d]pyrimidines of the instant invention bearing an unsubstituted amino group in the 4-position may be prepared by the method of Gewald, wherein an α-hydroxyketone is condensed with malononitrile in the presence of base, followed by cyclization with formamide. However, this method is inoperative with respect to the substituted amino compounds, i.e. compounds of Formula II and those of Formula I wherein $R_1$ and $R_2$ are not both hydrogen. One cannot conduct a reaction analogous to that of Gewald using appropriately substituted materials to obtain these substituted amino derivatives.

It has been found that the substituted amino derivatives other than the benzo and 5,6,7,8-tetrahydrobenzo compounds can be synthesized according to the following reaction scheme:

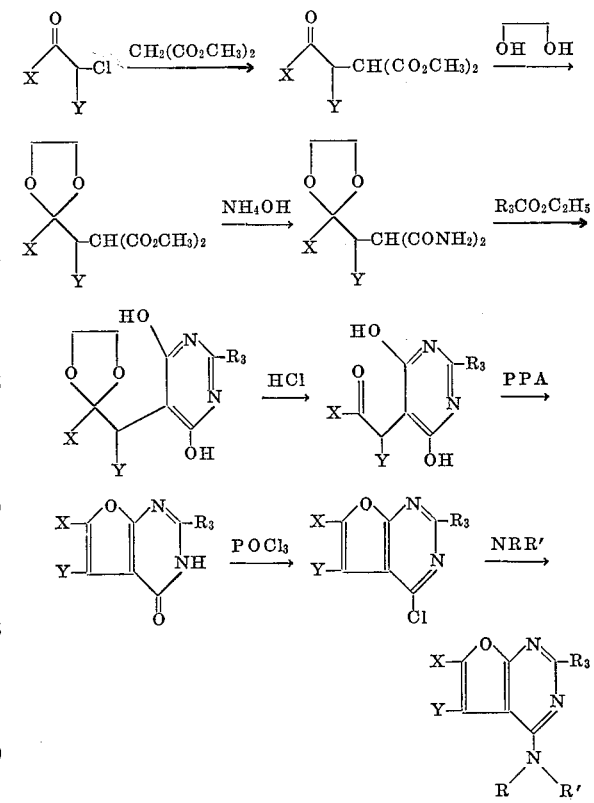

The first step of this reaction scheme is the condensation of an appropriate α-chloroketone or α-chloroaldehyde of the formula

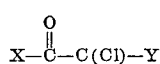

where X and Y correspond with the substituents of the desired product, with a malonic ester. Dimethyl malonate is convenient for this purpose, with the sodium salt thereof providing a means for facile condensation. This salt is prepared in the usual manner using sodium hydride in an inert organic solvent such as dimethylformamide, benzene, ether or other non-hydroxylic solvent. The α-chloroketone or aldehyde may then be added directly to the solution of the salt of the malonic ester, preferably in a dropwise manner to keep the reaction under control. Use of approximately molar equivalent amounts of the materials results in satisfactory yields. Neither time nor temperature appears to be critical in the condensation reaction; simply allowing the reaction mixture to cool to room temperature after the addition has been found to be adequate to afford the desired product, which may then be isolated by means obvious to those with ordinary skill in the art. For example, distillation or extraction are convenient procedures. A bromoketone or aldehyde might be substituted for aforesaid chloro compounds.

The ethylene ketal derivative of the initial condensation product is formed to prevent interaction of the carbonyl group with reagents used in subsequent steps. The ketal may be prepared by means of the usual acid catalyzed reaction with ethyelne glycol in a common inert solvent such as benzene, toluene or other solvent which forms an azeotrope with water. p-Toluenesulfonic acid is acceptable as catalyst. Time is not critical but reflux temperature should be used in order to azeotrope the water. It has been found that refluxing in benzene for several hours is often necessary to obtain satisfactory yield. The ketal may be conveniently isolated by extraction from aqueous sodium bicarbonate solution.

The malonate ethylene ketal derivative thus obtained is then converted to the corresponding malonamide ketal by treatment with an excess of ammonium hydroxide, liquid ammonia or the like. This material is then dissolved in ethanoic sodium ethoxide, preferably with at least 2 molar equivalents of sodium ethoxide being present in solution. To this solution is added an ester of alkanoic acid $R_3$—$CO_2H$, where $R_3$ corresponds with the desired substituent in the 2-position of the final product. For example, ethyl formate yields a 2-unsubstituted pyrimidine and ethyl acetate yields a 2-methyl pyrimidine. Refluxing the resulting mixture for a short while has been found to afford a satisfactory yield of the 4,6-dihydroxypyrimidine although lower temperatures may be used with correspondingly increased reaction times. The product can be isolated by precipitation of the free acid.

The ketal blocking group is removed by treatment with concentrated hydrochloric acid. Cyclization to the furo-[2,3-d]pyrimidine system is than accomplished by heating the resulting free carbonyl compound in an excess of polyphosphoric acid. Reaction temperature between about 130° and 150° C. and reaction time between about 15 and 45 minutes is desirable. Heating to about 140° C. for 30 minutes has been found to be sufficient to afford the desired furo[2,3 - d]pyrimidine-4-one, which is conveniently isolated by precipitation of the free base from aqueous solution.

The furo[2,3-d]pyrimidine-4-one is converted to the corresponding 4-chloro derivative by treatment with an excess of hot phosphorous oxychloride. Refluxing the mixture for approximately one half hour gives a high yield of the chlorinated product, which is also readily isolated by precipitation of the free base from aqueous solution.

Treatment of the 4-chloro compound with an appropriately substituted amine affords the desired 4-aminofuro-[2,3-d]pyrimidines of Formulae I and II. For example, dimethylamine gives the 4-dimethylamino derivative. However, in the preparation of compounds of Formula II wherein both nitrogens of the alkylenediamine reagent bear at least one hydrogen atom, either nitrogen might bond to the pyrimidine. Therefore, should the alkylenediamine by asymmetrical, a mixture of two products would be formed. For example, N-methylethylenediamine would provide a mixture of compounds of Formula II having as $R_4/R_5/R_6$ substituents hydrogen/hydrogen/methyl and methyl/hydrogen/hydrogen.

The formation of the desired amino derivative is conveniently performed in a medium such as refluxing ethanol, with the amine being bubbled through the mixture if it is a gas. A reaction time of about one hour is sufficient at reflux temperature of ethanol, with longer reaction times being desirable at lower temperatures. The product is conveniently isolated merely by recrystallization of the residue from the reaction mixture.

The 5,6,7,8-tetrahydrobenzofuro[2,3-d]pyrimidines of the instant invention bearing a substituted amino group in the 4-position are prepared from the corresponding furo[2,3-d]pyrimidine-4-one in a manner analogous to that described hereinbefore, viz. the furo[2,3-d]pyrimidine-4-one is converted to the 4-chloro derivative by treatment with phosphorous oxychloride, and the 4-chloro derivative is finally converted to the desired 4-amino compound by treatment with the appropriately substituted amine. However, said 5,6,7,8-tetrahydrobenzofuro[2,3-d] pyrimidine-4-ones are most conveniently prepared by nitrous acid oxidation of the corresponding 4-(unsubstituted)amino compounds. This reaction may be carried out by adding sodium nitrite to a solution of the amino compound in aqueous sulfuric acid. The reagent should be added cautiously to keep the reaction under control, for example by the dropwise addition of an aqueous solution of the sodium nitrite. Also, it may be desirable to cool the reaction mixture during the addition. The use of an excess of the reagent is often helpful in obtaining a good yield. Reaction time and temperature are not critical although, as mentioned, a relatively low temperature is desirable because of the exothermic nature of the reaction. Several hours is usually sufficient time in order to get a satisfactory yield. The product may be isolated by means familiar to those skilled in the art, such as precipitation, extraction and the like. The furo[2,3-d]pyrimidine-4-one may then be converted to the 4-chlorofuro[2,3-d]pyrimidine by means disclosed hereinbefore.

A convenient synthesis of the various 4-aminobenzofuro[2,3-d]pyrimidines is by the dehydrogenation of the corresponding 5,6,7,8-tetrahydrobenzofuro[2,3-d]pyrimidines, for example by heating with sulfur in Decalin or palladium/carbon. Heating a solution of the tetrahydrobenzo compound in decalin with at least two molar equivalents of finely powdered sulfur results in evolution of hydrogen sulfide and the formation of the desired benzo compound which may be isolated by means familiar to one skilled in the art, for example crystallization or by precipitation. The product may be purified by recrystallization or chromatography or the like.

The compounds of the instant invention inhibit the activity of the enzyme cyclic 3',5'-nucleotide phosphodiesterase, which catalyzes the conversion of adenosine-3',5'-monophosphate (cyclic 3',5'-AMP) to adenosine-5'-monophosphate (5'-AMP). Thus, in systems showing phosphodiesterase activity in which it is desirable to maintain a high cyclic 3',5'-AMP level, the instant compounds might be used to great advantage. They are sufficiently potent inhibitors of the enzyme activity that concentrations as low as $10^{-4}$ molar and even lower are effective. The ability of the instant compounds to inhibit the enzyme activity is of significance since it is well known that many tissues exhibit cyclic 3',5'-nucleotide phosphodiesterase activity, and that the mononucleotide cyclic 3',5'-AMP is an important regulator of numerous cellular and tissue processes, e.g. smooth muscle relaxation, lipolysis and glycogenolysis.

Those compounds of Formula I wherein $R_1$ and $R_2$ are each selected from either hydrogen or alkyl containing up to 6 carbon atoms are preferred agents for the inhibition of the enzyme's activity, particularly when X and Y are selected from among hydrogen, alkyl, phenyl, and tetrahydrobenzo. Specific compounds which are particularly effective as phosphodiesterase inhibitors are 4-diethylamino-6-phenylfuro[2,3-d]-pyrimidine, and 4-ethylamino-5,6,7,8-tetrahydrobenzofuro[2,3-d]pyrimidine, and 4-diethylamino - 5,6,7,8 - tetrahydrobenzofuro[2,3 - d]pyrimidine. The latter is especially potent for this purpose.

The compounds of the instant invention inhibit the enzyme's activity in smooth muscle tissue, a phenomenon recognized by those skilled in the art to correlate with smooth muscle relaxation. For example, theophylline, papaverine and many other effective antispasmodic agents for smooth muscle have been found to inhibit phosphodiesterase activity in smooth muscle tissue. Similarly, the instant compounds have been found to relax smooth muscle in animals as well as in standard in vitro tests. Of course, the effectiveness of a particular compound will vary from one smooth muscle tissue to another and the selection of the compound to be administered will depend upon the tissue to be relaxed. However, the instant compounds all effect bronchodilation, and for this purpose preferred agents are 4-amino-5,6,7,8-tetrahydrobenzofuro[2,3-d]pyrimidine, 4 - methylamino - 5,6 - dimethylfuro[2,3-d]pyrimidine, 4-dimethylamino-6-methylfuro[2,3-d]pyrimidine and 4 - methylamino - 6 - methylfuro[2,3 - d]pyrimidine.

The instant compounds may be administered for the purpose of relaxing a specific smooth muscle tissue in the same manner as are other agents of the prior art which are normally administered for the relaxation of that particular tissue. Generally, the compound will be administered with a pharmaceutical carrier selected on the basis of the chosen route of administration and standard pharmaceutical practice. For example, they may be combined with various pharmaceutically-acceptable inert carriers in the form of tablets, capsules, lozenges, troches, hard candies, powders, sprays, aqueous suspensions or solutions, injectable solutions, elixirs, syrups and the like. Such carriers include solid diluents, or filters, sterile aqueous media and various non-toxic organic solvents. Moreover, the oral pharmaceutical compositions of this invention may be suitably sweetened and flavored by means of various agents of the type commonly used for this purpose.

The particular carrier selected and the proportion of active ingredient to carrier are influenced by the solubility and chemical nature of the therapeutic compounds, the chosen route of administration and the needs of the standard pharmaceutical practice. For example, where these compounds are administered orally in tablet form, excipients such as lactose, sodium citrate, calcium carbonate and dicalcium phosphate may be used. Various disintegrants such as starch, alginic acids, and certain complex silicates, together with lubricating agents such as magnesium stearate, sodium lauryl sulphate and talc, may also be used in producing tablets for the oral administration of these compounds. For oral administration in capsule form, lactose and high molecular weight polyethylene glycols are among the preferred materials for use as pharmaceutically acceptable carriers. Where aqueous suspensions are to be used for oral administration, the compounds of this invention may be combined with emulsifying or suspending agents. Diluents such as ethanol, propylene glycol, glycerine and their combinations may be employed as well as other materials.

For purposes of parenteral administration and inhalation, solutions or suspensions of the instant compounds in sesame or peanut oil or in aqueous propylene glycol solutions can be employed, as well as sterile aqueous solutions of the soluble acid addition salts described hereinafter. These particular solutions are especially suited for intramuscular and subcutaneous injection purposes. The aqueous solutions, including those of the acid addition salts dissolved in pure distilled water, are also useful for intravenous injection purposes provided that their pH is properly adjusted beforehand. Such solutions should also be suitably buffered, if necessary, and the liquid diluent first rendered isotonic with sufficient saline or glucose.

The compounds may be administered to subjects suffering from bronchoconstriction by means of inhalators or other devices which permit the active compounds to come into direct contact with the constricted areas of the tissues of the subject. When administered by means of a spray formulated as a 1% solution, utilization once or twice a day is preferred.

It is necessary that the active ingredient form a proportion of the composition such that a suitable dosage form will be obtained. Obviously, several dosage unit forms may be administered about the same time. Although compositions with less than 0.005% by weight of active ingredient might be used in certain instances, it is preferred to use compositions containing not less than 0.005% of the active ingredient; otherwise the amount of carrier becomes excessively large. Activity increases with the concentration of the active ingredient. The composition may contain 10, 50, 75, 95 or an even higher percentage by weight of the active ingredient.

The physician will determine the dosage which will be most suitable, and it will vary with the age, weight and response of the particular patient as well as with the nature and extent of the symptoms and the pharmacological characteristics of the particular agent to be administered. Generally, small doses will be administered initially, with a gradual increase in the dosage until the optimum level is determined. It will often be found that when the composition is administered orally, larger quantities of the active ingredient will be required to produce the same level as produced by a small quantity administered parenterally. In general, a dosage level within the range of from about 0.02 to about 200 mg. of active ingredient per kilogram of body weight, administered in single or multiple dose units, will effectively alleviate bronchoconstriction. Of course, there can be individual cases where higher or lower dosage levels are desirable, and such are within the scope of this invention.

The instant compounds may be conveniently administered in the form of pharmaceutically-acceptable salts. By "pharmaceutically-acceptable" is meant those salts which do not have substantially greater toxicity than the free compound. The pharmaceutically acceptable acid addition salts of the instant compounds include salts of mineral acids such hydrochloric, hydrobromic, hydriodic, phosphoric, metaphosphoric, nitric and sulfuric acids, as well as salts of organic acids such as tartaric, acetic, citric, maleic, benzoic, glycollic, gluconic, gulonic, succinic, arylsulfonic, e.g. p-toluenesulfonic acid and the like.

The pharmaceutically-unacceptable salts, while not useful for therapy, are valuable for use in the isolation and purification of these newly discovered compounds. Furthermore, they are useful for the preparation of the therapeutically valuable pharmaceutically-acceptable salts. Of this group, the more common salts include those formed with hydrofluoric and perchloric acids. Hydrofluoride salts are particularly useful for the preparation of the pharmaceutically-acceptable salts. The hydrochloride salts, for example, may be prepared by the solution of the hydrofluoride salts in hydrochloric acid and crystallization of the hydrochloride salt thereby formed.

The ability of these compounds to inhibit phosphodiesterase is not restricted to chemotherapeutic applications only, but is of substantial utility in various biological in vitro systems as well. In situations in which it is desirable to determine the characteristics and properties of certain enzyme systems other than phosphodiesterase, it often is impossible to observe and measure various effects without first inhibiting phosphodiesterase activity. For example, J. R. Turtle and D. M. Kipnis, Biochemical and Biophysical Research Communications 28, 797 (1967) required an inhibitor of phosphodiesterase activity in order to elucidate certain features of the adenyl cyclase system. However, only two substances have been found useful for this application heretofore, the xanthines theophylline and caffeine. There are substantial disadvantages to the use of these two agents, primarily problems derived from their potency and solubility characteristics. The compounds of the instant invention are of at least comparable potency as inhibitors of phosphodiesterase, and in addition, their multiplicity of substituents provides for a variety of solubility, tissue permeability and tissue specificity advantages. Thus, the instant compounds allow one greater freedom in selection of conditions and procedures, since it is not necessary to adjust these features to the demands of a specific inhibitor of phosphodiesterase.

The ability of the instant compounds to inhibit the enzyme phosphodiesterase also renders them useful for the purpose of increasing the water permeability and cation transport of certain membranes derived from animal sources.

Furthermore, under circumstances when it is desirable to obtain the nucleotide cyclic 3',5'-AMP from biological sources, the instant compounds are useful for increasing the amount of material which can be isolated. Theophylline has been observed to increase the level of cyclic 3',5'-AMP in certain media as much as 1500 percent, and the instant compounds are of the same order potency.

In a related application, it is often helpful for diagnostic purposes to determine the level of cyclic 3',5'-AMP in various animal tissues. Inasmuch as the common assays for determining cyclic 3',5'-AMP content of tissue call for an inhibitor of cyclic 3',5'-nucleotide phosphodiesterase, the instant compounds can be used to great advantage.

It is expected that compounds of Formulae I and II wherein X is alkoxy contaiing up to 4 carbon atoms, especially methoxy, will be useful for chemotherapeutic and biological purposes in the same manner as compounds of Formulae I and II wherein X is as aforesaid. However, to obtain said compounds wherein X is alkoxy, it is desirable to proceed through the diethyl acetal of chloroacetaldehyde.

The following examples are provided to more fully illustrate the present invention, but are not to be construed as being the only embodiments possible or as limiting the scope thereof in any way.

EXAMPLE I 4-dimethylamino-6-methylfuro[2,3-d]pyrimidine (A) Dimethyl acetonylmalonate.—Dimethyl malonate (264.2 g., 2.0 moles) was added dropwise to a slurry of sodium hydride in 1500 ml. of dimethylformamide. The reaction mixture is cooled during the addition to maintain the temperature below 65° C. To the resulting solution is added freshly distilled chloroacetone (185 g., 2.0 moles) in a dropwise manner, with the temperature still being maintained below 65° C. The resulting pale brown slurry was allowed to cool to room temperature and was then poured into 1500 ml. of water. The aqueous solution was then extracted with four 200 ml. portions of methylene chloride and the combined methylene chloride extracts were dried over sodium sulfate and evaporated. The resulting oil was distilled, and after a forerun of dimethyl malonate, the desired product was obtained as a clear colorless liquid, 222 g. (59%), B.P. 135–146° C. (12 mm. Hg), $n_D^{25}$ 1.4400. A sample purified by gas chromatography had $n_D^{25}$ 1.4379.

Analysis.—Calc'd for $C_8H_{12}O_5$ (percent): C, 51.06; H, 6.43. Found (percent): C, 51.17; H, 6.49.

(B) Dimethyl acetonylmalonate, ethylene ketal.—A mixture of dimethyl acetonylmalonate (174 g., 0.926 mole), from section A, ethylene glycol (57.3 g., 0.926 mole) and p-toluenesulfonic acid (100 mg.) in 1000 ml. of benzene was stirred at reflux temperature for 16 hours under a Dean-Stark water separator, in which 22.0 ml. of water was collected. The resulting solution was allowed to cool and was then poured into 500 ml. of sodium bicarbonate solution. The organic layer was removed and dried over sodium sulfate, and was then evaporated to afford the desired product as an orange oil, 205 g. (95.4%), $n_D^{25}$ 1.4543. A sample purified by gas chromatography had $n_D^{25}$ 1.4465.

Analysis.—Calc'd for $C_{10}H_{16}O_6$ (percent): C, 51.72; H, 6.94. Found (percent): C, 51.85; H, 7.08.

(C) Acetonylmalonamide, ethylene ketal.—A solution of dimethyl acetonylmalonate ethylene ketal (200 g., 0.86 mole), from section B, in 500 ml. of concentrated ammonium hydroxide solution and 100 ml. of methanol was stirred at room temperature for 20 hours. The resulting slurry was filtered and washed with methanol to separate the desired product as a white crystalline solid, 99.0 g. (57%), M.P. 177–178° C. The filtrate was concentrated to a gummy residue which was triturated with methanol to afford an additional 26.0 g. (15%) of the white crystalline product, M.P. 171–173° C. Total yield 72%. An analytical sample was prepared by recrystallization from methanol and had M.P. 177–178° C.

Analysis.—Calc'd for $C_8H_{14}N_2O_4$ (percent): C, 47.52; H, 6.98; N, 13.86. Found (percent): C, 47.53; H, 7.12; N, 13.92.

(D) 5 - acetonyl - 4,6 - dihydroxypyrimidine, ethylene ketal.—A solution of sodium ethoxide in ethanol is prepared by adding 28.5 g. (1.24 moles) of sodium metal to 1200 ml. of anhydrous ethanol. To this solution was added acetonylmalonamide, ethylene ketal (125.0 g., 0.62 mole), from section C, to give an almost complete solution. Then, freshly distilled ethyl formate (92.0 g., 1.24 moles) was added to give an immediate precipitate. The resulting slurry was stirred at reflux for 1.5 hours, cooled and evaporated to remove most of the ethanol. The residue was dissolved in 1500 ml. of water and the pH adjusted to 6.0 with concentrated hydrochloric acid solution. The mixture was filtered to separate the desired product as white crystalline solid, 85.0 g. (65%), M.P. 200–202° C. (dec.). An analytical sample was recrystalized from dimethylformamide.

Analysis.—Calc'd for $C_9H_{12}N_2O_4$ (percent): C, 50.94; H, 5.70; N, 13.20. Found (percent): C, 50.62; H, 5.88; N, 13.48.

(E) 5-acetonyl-4,6-dihydroxypyrimidine.—A solution of 5-acetonyl - 4,6 - dihydroxypyrimidine, ethylene ketal, (83.0 g., 0.39 mole), from section D, in 175 ml. of concentrated hydrochloric acid was stirred at reflux for 15 minutes. The resulting yellow solution was cooled to 0° C. and 800 ml. of ethanol were added. The mixture was filtered to separate the desired product as a beige crystalline solid, 44.0 g. (67%), M.P. 248–249° C. (dec.). The analytical sample was recrystallized from water.

Analysis.—Calc'd for $C_7H_8N_2O_3$ (percent): C, 50.00; H, 4.80; N, 16.66. Found (percent): C, 49.98; H, 5.00; N, 16.45.

(F) 6-methylfuro[2,3-d]pyrimidine - 4 - one.—To 210 ml. of polyphosphoric acid was added 5-acetonyl-3,4-dihydroxypyrimidine (42 g., 0.25 mole), from section E, and the mixture was heated at 140° C. for 30 minutes. A complete solution formed after 15 minutes. The solution was cooled to room temperature and poured slowly into vigorously stirred ice water. After neutralization with about 300 ml. of concentrated ammonium hydroxide, the slurry was filtered to separate the desired product as a beige crystalline solid, 33.0 g. (88%), M.P. 228–230° C.

(G) 4 - chloro - 6 - methylfuro[2,3-d]pyrimidine.—A slurry of 6-methylfuro[2,3-d]pyrimidine-4-one (31.0 g., 0.206 mole), from section F, in 220 ml. of phosphorous oxychloride was refluxed with stirring for 35 minutes, with complete dissolution occurring in 5 minutes. The solution was cooled and concentrated and the residue added slowly to 500 ml. of concentrated ammonium hydroxide solution and filtered to separate the desired product as a crystalline solid, 35.0 g. (100%), M.P. 85–88° C. An analytical sample was prepared by recrystallization from methanol-water and had M.P. 80–81° C.

*Analysis.*—Calc'd for $C_7H_5N_2ClO$ (percent): C, 49.87; H, 2.99; N, 16.62; Cl, 21.03. Found (percent): C, 49.84; H, 2.88; N, 16.67; Cl, 20.78.

(H) 4 - dimethylamino - 6 - methylfuro[2,3-d]pyrimidine.—Into a stirred refluxing slurry of 4-chloro-6-methylfuro[2,3-d]pyrimidine (4.0 g., 0.0238 mole), from section G, in 100 ml. of absolute ethanol was bubbled dimethylamine for 30 minutes and the resulting solution was heated for an additional 30 minutes. After evaporation to dryness, the residue was recrystallized from 75 ml. of hexane to separate the analytically pure product as large beige needles, 2.7 g. (64%), M.P. 107–109° C.

*Analysis.*—Calc'd for $C_9H_{11}N_3O$ (percent): C, 61.00; H, 6.26; N, 23.72. Found (percent): C, 61.29; H, 6.53; N, 23.75.

EXAMPLE II

The procedure of Example I was repeated wherein an equivalent amount of ammonia or appropriately substituted amine was added to the reaction mixture in section H in place of dimethylamine. The following products were thus obtained and were recrystallized from the indicated solvent.

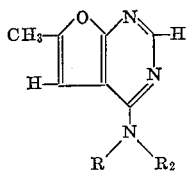

| $R_1$ | $R_2$ | Recryst. solvent | M.P., ° C. |
|---|---|---|---|
| H | $CH_3$ | Water | 177–179 |
| H | $C_2H_5$ | Water | 82–83 |
| $C_2H_5$ | $C_2H_5$ | | Oil |
| $n-C_3H_7$ | $n-C_3H_7$ | Methanol/water | 78–80 |
| H | $C_6H_5$ | Benzene | 166–167 |
| H | H | From HCl salt | 187–189 |
| $-(CH_2)_2-\overset{CH_3}{N}-(CH_2)_2-$ | | i-Propylether | 109–110 |
| $-(CH_2)_2-\overset{CH_2CH=CH_2}{N}-(CH_2)_2-$ | | Hexane | 90–91 |
| $-(CH_2)_2-\overset{CO_2\text{-}iBu}{N}-(CH_2)_2-$ | | Methanol/water | 103–104 |

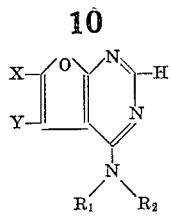

| X | Y | $R_1$ | $R_2$ | Recryst. solvent | M.P., ° C. |
|---|---|---|---|---|---|
| $CH_3$ | $CH_3$ | H | $CH_3$ | Methanol/water | 193–194 |
| $CH_3$ | $CH_3$ | $CH_3$ | $CH_3$ | do | 84–85 |
| $CH_3$ | $CH_3$ | H | H | Methanol | 250–252 |
| $C_6H_5$ | H | H | $CH_3$ | do | 196–197 |
| $C_6H_5$ | H | $C_2H_5$ | $C_2H_5$ | Methanol/water | 95–96 |

EXAMPLE IV

The procedure of Example I is repeated using an equivalent amount of appropriate α-chloroketone in section A and equivalent amount of ammonia or appropriate amine in section H to afford the following products

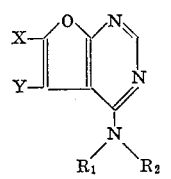

| X | Y | $R_1$ | $R_2$ |
|---|---|---|---|
| H | H | H | H |
| H | H | H | $i-C_3H_7$ |
| H | H | $CH_3$ | $n-C_6H_{13}$ |
| H | $n-C_4H_9$ | $CH_3$ | $-(CH_2)_2CH=C(CH_3)_2$ |
| $n-C_4H_9$ | $n-C_4H_9$ | H | $CH_2CH=CH_2$ |
| $C_2H_5$ | H | $C_6H_5$ | $C_6H_5$ |
| H | $CH_3$ | H | $C_{10}H_7$ |
| $CH_3$ | $CH_3$ | $CH_3$ | $CH_2CH_2OH$ |
| $i-C_3H_7$ | $i-C_3H_7$ | H | $CH_2CH_2OH$ |
| $n-C_4H_9$ | H | $-(CH_2)_2-O-(CH_2)_2-$ | |
| $CH_3$ | $CH_3$ | $-(CH_2)_2-O-(CH_2)_2-$ | |
| $C_6H_5$ | H | $-(CH_2)_2-S-(CH_2)_2-$ | |
| $C_6H_5$ | $CH_3$ | H | $-(CH_2)_2-\overset{H}{N}-(CH_2)_2-$ |
| $C_{10}H_7$ | H | H | $-(CH_2)_2-\overset{H}{N}-(CH_2)_2-$ |
| $CH_3$ | H | $C_6H_5$ | $-(CH_2)_2-\overset{C_6H_5}{N}-(CH_2)_2-$ |
| $CH_3$ | H | $C_{10}H_7$ | $-(CH_2)_2-\overset{C_{10}H_7}{N}-(CH_2)_2-$ |

EXAMPLE III

The procedure of Example I-A was repeated using equivalent amounts of 3-chloro-2-butanone and α-chloroacetophenone in place of chloroacetone to afford, respectively, dimethyl α-methylacetonylmalonate and dimethyl phenacylmalonate. These two dimethyl malonates, in turn, were subjected to the reaction sequence of Example IB–H, using an equivalent amount of ammonia or appropriate amine in section H in place of dimethylamine. The following products were thus obtained and were recrystallized from the indicated solvent.

EXAMPLE V 4-dimethylamino-2,6-dimethylfuro[2,3-d]pyrimidine

The procedure of Example I is repeated wherein an equivalent amount of ethyl acetate is used in section D in place of ethyl formate, to yield the desired 4-dimethylamino-2,6-dimethylfuro[2,3-d]pyrimidine.

EXAMPLE VI

The procedure of Example III is repeated wherein an equivalent amount of ethyl butyrate is used in place of said ethyl formate in section D, to afford the following compounds

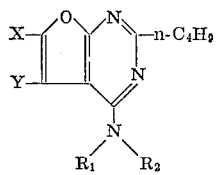

| X | Y | R₁ | R₂ |
|---|---|---|---|
| CH₃ | CH₃ | H | CH₃ |
| CH₃ | CH₃ | CH₃ | CH₃ |
| CH₃ | CH₃ | H | H |
| C₆H₅ | H | H | CH₃ |
| C₆H₅ | H | C₂H₅ | C₂H₅ |

EXAMPLE VII

4-Aminomethylamino-6-methylfuro[2,3-d]pyrimidine

The procedure of Example I is repeated wherein an equivalent amount of diaminomethane is used in section H in place of said dimethylamine, to afford the desired 4-aminomethylamino-6-methylfuro[2,3-d]pyrimidine.

EXAMPLE VIII

The procedure of Example III is repeated wherein an equivalent amount of either 1-amino-2-dimethylamino-ethane or 1-amino-2-methylaminoethane are used in section H, to afford the following products.

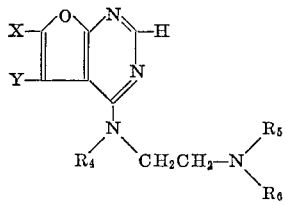

| X | Y | R₄ | R₅ | R₆ |
|---|---|---|---|---|
| CH₃ | CH₃ | H | CH₃ | CH₃ |
| CH₃ | CH₃ | H | CH₃ | H |
| CH₃ | CH₃ | CH₃ | H | H |
| C₆H₅ | H | H | CH₃ | CH₃ |
| C₆H₅ | H | H | CH₃ | H |
| C₆H₅ | H | CH₃ | H | H |

EXAMPLE IX 4-amino-5,6,7,8-tetrahydrobenzofuro[2,3-d]pyrimidine

The desired product was prepared by condensation of α-hydroxycyclohexanone and malononitrile, followed by cyclization with formamide in the manner of K. Gewald, Chem. Ber. 99, 1002–7 (1966).

EXAMPLE X 4-dimethylamino-5,6,7,8-tetrahydrobenzofuro[2,3-d]pyrimidine (A) 5,6,7,8 - tetrahydrobenzofuro[2,3-d]pyrimidine-4-one.—4 - amino - 5,6,7,8 - tetrahydrobenzofuro[2,3-d]pyrimidine (100 g., 0.53 mole), prepared as in Example IX, was added to a cold solution of 1250 ml. of water and 600 ml. of sulfuric acid. While maintaining the temperature at 10° C., to this solution was added dropwise over a 30 minute period sodium nitrite (157 g., 2.3 moles) in 380 ml. of water. The mixture was stirred for an additional hour and then cooled to 0° C. The resulting precipitate was separated by filtration to afford the desired product, 60 g. (60%), M.P. 179–181° C.

(B) 4 - chloro - 5,6,7,8 - tetrahydrobenzofuro[2,3-d]pyrimidine.—A mixture of 5,6,7,8-tetrahydrobenzofuro[2,3-d]pyrimidine-4-one (55.0 g., 0.29 mole), from section A, in 500 ml. of phosphorous oxychloride was stirred at reflux temperature for 1 hour. The resulting solution was cooled and concentrated and the residue added slowly to 1000 ml. of cold concentrated ammonium hydroxide. Filtration of the resulting precipitate afforded the desired product, 36 g. (60%), M.P. 123–126° C. An analytical sample was recrystallized from ethanol, M.P. 133–134° C.

*Analysis.*—Calc'd for C₁₀H₉N₂OCl (percent): C, 57.56; H, 4.35; N, 13.43; Cl, 16.99. Found (percent): C, 57.48; H, 4.29; N, 13.40; Cl, 16.93.

(C) 4 - dimethylamino - 5,6,7,8 - tetrahydrobenzofuro[2,3-d]pyrimidine.—Into a stirred refluxing slurry of 4-chloro-5,6,7,8-tetrahydrobenzofuro[2,3-d]pyrimidine (10 g., 0.048 mole), from section B, in 100 ml. of absolute ethanol was bubbled dimethylamine for 30 minutes and the resulting solution was heated for an additional 30 minutes. After evaporation to dryness, the residue was recrystallized from methanol/water to afford the desired product, M.P. 97–99° C.

EXAMPLE XI

The procedure of Example X was repeated using an equivalent amount of appropriate amine in section C in place of dimethylamine to afford the following products.

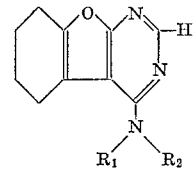

| R₁ | R₂ | Recryst. solvent | M.P., °C. |
|---|---|---|---|
| H | CH₃ | Methanol | 185–187 |
| H | C₂H₅ | do | 146–147 |
| C₂H₅ | C₂H₅ | Methanol/water | 110–111 |
| H | C₆H₅ | Ethanol | 134–135 |
| H | CH₂CH₂OH | Ethyl acetate | 136–138 |

EXAMPLE XII 4-amino-2-methyl-5,6,7,8-tetrahydrobenzofuro[2,3-d]pyrimidine

The procedure of Example IX is repeated using an equivalent amount of acetamide in section B in place of formamide to afford the desired product.

EXAMPLE XIII 4-amino-5,6-hexamethylenefuro[2,3-d]pyrimidine

The procedure of Example IX is repeated using an equivalent amount of α-hydroxycyclooctanone in section A in place of α-hydroxycyclohexanone to afford the desired product.

EXAMPLE XIII–B 4-diethylaminoethylamino-5,6,7,8-tetrahydrobenzofuro[2,3-d]pyrimidine The procedure of Example X is repeated wherein an equivalent amount of β-(diethylaminoethyl)amine is used in section C in place of said dimethylamine to afford the desired product as an oil. The hydrochloric acid addition salt melts at 212° C.

EXAMPLE XIV

Pharmaceutically-acceptable salts

The hydrochloric acid addition salts of the furo[2,3-d]pyrimidines of the instant invention are prepared by mixing an alcoholic solution of the bases, prepared as in Examples I–III and IX–XI, with aqueous hydrochloric acid and evaporating the resulting solution.

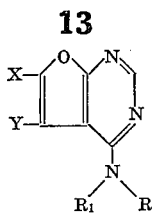

| X | Y | R₁ | R₂ | HCl salt, M.P., °C. |
|---|---|---|---|---|
| CH₃ | H | H | CH₃ | 240-242 |
| CH₃ | H | H | C₂H₅ | 227-228 |
| CH₃ | H | CH₃ | CH₃ | ¹242-244 |
| CH₃ | H | C₂H₅ | C₂H₅ | 170-171 |
| CH₃ | H | H | C₆H₅ | 221-223 |
| CH₃ | H | n-C₃H₇ | n-C₃H₇ | 174-176 |
| CH₃ | H | \multicolumn{2}{c}{CH₃, —(CH₂)₂—N—(CH₂)₂—} | ¹286-287 |
| CH₃ | H | \multicolumn{2}{c}{CH₂CH=CH₂, —(CH₂)₂—N—(CH₂)₂—} | ¹252-252.5 |
| CH₃ | H | \multicolumn{2}{c}{CO₂-i-C₄H₉, —(CH₂)₂—N—(CH₂)₂—} | 194-201 |
| CH₃ | CH₃ | H | CH₃ | ¹273-276 |
| CH₃ | CH₃ | H | CH₃ | ¹257-259 |
| CH₃ | CH₃ | CH₃ | CH₃ | 185-186 |
| C₆H₅ | H | H | CH₃ | 246-247 |
| C₆H₅ | H | C₂H₅ | C₂H₅ | 203-205 |
| —(CH₂)₄— | | H | CH₃ | 210-212 |
| —(CH₂)₄— | | H | C₂H₅ | 232-235 |
| —(CH₂)₄— | | CH₃ | CH₃ | 114-116 |
| —(CH₂)₄— | | C₂H₅ | C₂H₅ | 157-159 |
| —(CH₂)₄— | | H | C₆H₅ | 191-193 |
| —(CH₂)₄— | | H | CH₂CH₂OH | 187 |

¹ Dec.

Other pharmaceutically-acceptable acid addition salts of these compounds are prepared by this same procedure employing hydrobromic acid, hydriodic acid, nitric acid, sulfuric acid, citric acid, phosphoric acid, maleic acid, tartaric acid and lactic acid in place of acid hydrochloric acid.

EXAMPLE XV 4-amino-benzofuro[2,3-d]pyrimidine

A solution of 4 - amino - 5,6,7,8-tetrahydrobenzofuro [2,3-d]pyrimidine (18.9 g., 0.10 mole) and finely powdered sulfur (8 g., 0.25 mole) in 100 ml. of Decalin is heated to 200° C. under a nitrogen atmosphere and the temperature is maintained until evolution of hydrogen sulfide ceases. Hexane is then added to the cooled reaction mixture to precipitate the desired product, which is collected by filtration.

EXAMPLE XVI

The procedure of Example XV is repeated using an equivalent amount of products of Examples X–XII in place of said tetrahydrobenzofuro[2,3-d]pyrimidine to afford the following products:

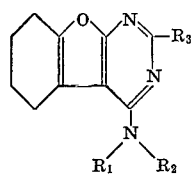

| R₁ | R₂ | R₃ |
|---|---|---|
| CH₃ | CH₃ | H |
| H | CH₃ | H |
| H | C₂H₅ | H |
| C₂H₅ | C₂H₅ | H |
| H | C₆H₅ | H |
| H | H | CH₃ |

EXAMPLE XVII

Tablets

A tablet base is prepared by blending the following ingredients in the proportion by weight indicated:

| | |
|---|---|
| Sucrose, U.S.P. | 80.3 |
| Tapioca starch | 13.2 |
| Magnesium stearate | 6.5 |

Into this tablet base there is blended sufficient 4-amino-5,6,7,8-tetrahydro-benzofuro[2,3-d]pyrimidine to provide tablets containing 20, 100 and 250 mg. of active ingredient per tablet. The compositions are each compressed into tablets, each weighing 360 mg., by conventional means.

EXAMPLE XVIII

Capsules

A blend is prepared containing the following ingredients:

| | |
|---|---|
| Calcium carbonate, U.S.P. | 17.6 |
| Dicalcium phosphate | 18.8 |
| Magnesium trisilicate, U.S.P. | 5.2 |
| Lactose, U.S.P. | 5.2 |
| Potato starch | 5.2 |
| Magnesium stearate A | 0.8 |
| Magnesium stearate B | 0.35 |

To this blend is added sufficient 4-methylamino-5,6-dimethylfuro[2,3-d]-pyrimidine to provide capsules containing 20, 100 and 250 mg. of active ingredient per capsule. The compositions are filled into conventional hard gelatin capsules in the amount of 350 mg. per capsule.

EXAMPLE XIX

Injectable preparation

One thousand grams of 4-dimethylamino-6-methylfuro[2,3-d]pyrimidine hydrochloride are intimately mixed and ground with 2500 grams of sodium ascorbate. The ground dry mixture is placed in vials and sterilized with ethylene oxide after which the vials are sterilely stoppered. For intravenous administration, sufficient water is added to the materials in the vials to form a solution containing 10 mg. of active ingredient per milliliter of injectable solution.

EXAMPLE XX

Suspension

A suspension of 4-methylamino-6-methylfuro[2,3-d] pyrimidine is prepared with the following composition:

| | |
|---|---|
| Effective ingredient, g. | 25.00 |
| 70% Aqueous sorbitol, g. | 741.29 |
| Glycerine, U.S.P., g. | 185.35 |
| Gum acacia (10% solution), ml. | 100.0 |
| Polyvinylpyrrolidone, g. | 0.5 |
| Distilled water sufficient to make 1 liter. | |

To this suspension, various sweeteners and flavorants are added to improve the palatability of the suspension. The suspension contains approximately 25 mg. of effective agent per milliliter.

EXAMPLE XXI

Solution

A solution of 4 - amino-5,6,7,8-tetrahydrobenzofuro [2,3-d]pyrimidine hydrochloride is prepared with the following composition:

| | |
|---|---|
| Effective ingredient, grams | 30.22 |
| Magnesium chloride hexahydrate, grams | 12.36 |
| Monoethanolamine, ml. | 8.85 |
| Propylene glycol, grams | 376.0 |
| Water, distilled, ml. | 94.0 |

The resultant solution has a concentration of effective ingredient of 50 mg./ml. and is suitable for parenteral and especially for intramuscular administration.

A second solution is prepared with similar composition but containing 600 mg. of effective ingredient rather than 30.22 grams. This dilute solution is suitable for intranasal administration.

EXAMPLE XXII

Bronchodilator activity

Conscious female guinea pigs, which had been fasted for 12 hours, received oral or parenteral dosages of the compound which was to be tested for effectiveness. Control animals received doses of saline solution which did not contain the compound which was under test. Subsequent to this administration, each animal was challenged with histamine aerosol.

The challenge procedure consisted of spraying a 0.4 percent aqueous solution of histamine, at a pressure of 5 lb./in.$^2$ into an 8 x 8 x 12 inch plastic container for one minute. Immediately after the container was subjected to the histamine spray the animal was placed within it. At the end of one minute of exposure, the respiratory status, which is a reflection of bronchoconstriction, was evaluated. Evaluation levels were designated and scored as normal breathing (0), slightly deepened breathing (1), labored breathing (2), severely labored breathing and ataxia (3) and unconsciousness (4). Each group of animals contained 8 to 10 individuals and a control group containing the same approximate number was used. The scores for the control group and the group which had been treated with the compound under test were compared and the difference was expressed as percent protection.

The doses, which were given orally, were 60 mg./kg. and the animals were challenged with histamine 60 minutes later. The standard compound used was theophylline, which gave 25 percent protection when a dose of 60 mg./kg. was administered orally and the animal was challenged one hour later. When the compounds listed below were administered according to this procedure and the animals were challenged accordingly, the following percent protection was observed.

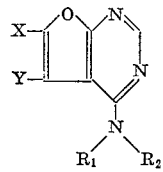

| X | Y | R$_1$ | R$_2$ | Percent protection |
|---|---|---|---|---|
| CH$_3$ | H | H | CH$_3$ | 27 |
| CH$_3$ | H | CH$_3$ | CH$_3$ | 28 |
| CH$_3$ | H | n-C$_3$H$_7$ | n-C$_3$H$_7$ | 11 |
| CH$_3$ | H | H | C$_6$H$_5$ | 7 |
| CH$_3$ | H | \multicolumn{2}{c}{—(CH$_2$)$_2$—N(CH$_3$)—(CH$_2$)$_2$—} | 17 |
| CH$_3$ | CH$_3$ | H | H | 13 |
| CH$_3$ | CH$_3$ | H | CH$_3$ | 35 |
| CH$_3$ | CH$_3$ | CH$_3$ | CH$_3$ | 10 |
| C$_6$H$_5$ | H | H | CH$_3$ | 13 |
| —(CH$_2$)$_4$— | | H | H | 38 |
| —(CH$_2$)$_4$— | | H | CH$_3$ | 13 |
| —(CH$_2$)$_4$— | | H | C$_2$H$_5$ | 23 |
| —(CH$_2$)$_4$— | | CH$_3$ | CH$_3$ | 7 |
| —(CH$_2$)$_4$— | | C$_2$H$_5$ | C$_2$H$_5$ | 23 |

EXAMPLE XXIII

Spirally cut strips of guinea pig trachea were prepared as described by J. W. Constantine, J. Pharm. Pharmacol., 16, 384 (1965). Isometric relaxations were recorded using a force displacement transducer (model FT–03, Grass Instrument Co., Quincy, Mass.) connected to a Grass Model 7 polygraph (Grass Instrument Co., of Quincy, Mass.).

The relative smooth muscle relaxing effects of each of the compounds tested were compared as follows:

(1) The muscle relaxant effect of a bathing medium of 0.03 μg./ml. of isoproterenol was determined for each strip and was shown to be supramaximal. This response was taken as the maximum relaxation of the strip.

(2) Subsequent relaxations of a given strip, to logarithmically spaced concentrations of the compounds under test, were determined and were converted to percent of isoproterenol-induced relaxation. Curves of dosege vs. percent of maximum relaxation were obtained for each compound.

(3) The figure reported below for each compound was that concentration (expressed in μg./ml.) of compound which was needed to obtain 50% of maximum relaxation (EC$_{50}$) of the trachael strip. Consequently, the smaller the EC$_{50}$ the more potent the compound was as a smooth muscle relaxant.

(4) Two standard compounds, theophylline (a known bronchodilator) and papaverine, were evaluated as well.

The following compounds were tested with corresponding values of EC$_{50}$:

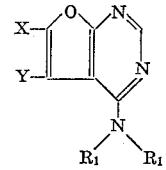

| X | Y | R$_1$ | R$_2$ | EC$_{50}$ |
|---|---|---|---|---|
| Theophylline | | | | 6.4 |
| Papaverine | | | | 0.3 |
| CH$_3$ | H | H | H | 27.0 |
| CH$_3$ | H | H | CH$_3$ | 7.0 |
| CH$_3$ | H | H | C$_2$H$_5$ | 3.3 |
| CH$_3$ | H | CH$_3$ | CH$_3$ | 2.6 |
| CH$_3$ | H | C$_2$H$_5$ | C$_2$H$_5$ | 1.2 |
| CH$_3$ | H | H | C$_6$H$_5$ | 1.1 |
| CH$_3$ | H | n-C$_3$H$_7$ | n-C$_3$H$_7$ | 4.0 |
| C$_6$H$_5$ | H | CH$_3$ | CH$_3$ | 0.42 |
| CH$_3$ | CH$_3$ | H | CH$_3$ | 1.7 |
| CH$_3$ | CH$_3$ | CH$_3$ | CH$_3$ | 2.3 |
| —(CH$_2$)$_4$— | | H | H | 3.2 |
| —(CH$_2$)$_4$— | | H | CH$_3$ | 2.4 |
| —(CH$_2$)$_4$— | | H | C$_2$H$_5$ | 4.0 |
| —(CH$_2$)$_4$— | | CH$_3$ | CH$_3$ | 1.2 |
| —(CH$_2$)$_4$— | | C$_2$H$_5$ | C$_2$H$_5$ | 0.37 |
| CH$_3$ | H | \multicolumn{2}{c}{—(CH$_2$)$_2$—N(CH$_3$)—(CH$_2$)$_2$—} | 25.6 |

EXAMPLE XXIV

Phosphodiesterase inhibition

Compounds of this invention were evaluated with respect to their power to inhibit the dephosphorylating activity of cyclic 3',5'-nucleotide phosphodiesterase, by which activity 3',5'-adenosine monophosphate is converted to 5'-adenosine monophosphate.

The cyclic 3',5'-nucleotide phosphodiesterase was isolated by the procedure of R. W. Butcher and E. W. Sutherland, J. Biol. Chem. 237, 1244 (1962) and their purification procedure was carried through the third step given, namely through the ammonium sulfate fractionation, dialysis and freezing steps, but not through the chromatographic fractionation step.

Two control compounds, papaverine and theophylline, each a known inhibitor of the enzyme, were run with each novel compound. Thus, at least four substrates, each containing 3',5'-adenosine monophosphate, were run for each novel compound being evaluated. One contained the novel compound, another contained theophylline, another contained papaverine and the last contained no phosphodiesterase inhibitor at all. Each substrate had a total volume of 2 ml., was 4×10$^{-4}$ molar in 3',5'-adenosine monophosphate, contained 0.02 ml. of cyclic 3',5'-nucleotide phosphodiesterase and 4.0 μmoles of MgSO$_4$, 0.2 μmole ethylenediaminetetraacetic acid and 80 μmoles of a suitable buffer to maintain the pH at 7.5. Where the substrate also contained a novel compound whose phosphodiesterase inhibitory power was to be tested or contained a control inhibitory compound, the compound was present at a concentration of 10⁻⁴ molar.

Each substrate was incubated for 30 minutes at 30° C. after which time the reaction was stopped by boiling for 10 minutes. At this point one mg. of lyophilized Crotolus atrox venom dissolved in one ml. of pH 7.5 buffer was added and the new mixture was incubated for 30 minutes at 30° C. and this reaction was also stopped by boiling for 10 minutes. The venom reacts with 5'-adenosine monophosphate, the dephosphorylation product, to release inorganic phosphates. Thus, a low final concentration of inorganic phosphate indicates that a small amount of 5'-adenosine monophosphate was formed and, therefore, that the phosphodiesterase activity was inhibited. The inorganic phosphorus was determined colorimetrically by the methods of C. H. Fiske and Y. Subbarow, J. Biol. Chem., 66, 375 (1925).

The percent inhibition was taken as the difference between the inorganic phosphate concentration in the substrate containing the inhibiting compound and the concentration in the substrate containing no inhibitor divided by the concentration in the substrate without inhibitor. The potency of the instant compounds relative to theophylline was determined by varying the concentration level of the inhibitors and applying standard methods of statistical analysis as outlined in D. J. Finney, Statistical Method in Biological Assay, Charles Griffin & Co., Ltd., London, 1952.

The following compounds were evaluated:

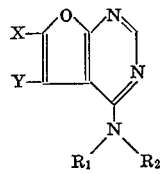

| X | Y | $R_1$ | $R_2$ | Percent inhibition | Potency relative to theophylline |
|---|---|---|---|---|---|
| Theophylline | | | | 5-15 | 1.0 |
| $CH_3$ | H | H | H | 2 | |
| $CH_3$ | H | H | $CH_3$ | 18 | |
| $CH_3$ | H | H | $C_2H_5$ | 26 | |
| $CH_3$ | H | $C_2H_5$ | $C_2H_5$ | 46 | |
| $CH_3$ | H | n-$C_3H_7$ | n-$C_3H_7$ | 75 | |
| $CH_3$ | H | H | $C_6H_5$ | 18 | |
| $CH_3$ | H | \multicolumn{2}{c|}{ —$(CH_2)_2$—N—$(CH_2)_2$—  /  $CH_2CH=CH_2$ } | 18 | |
| $CH_3$ | H | \multicolumn{2}{c|}{ —$(CH_2)_2$—N—$(CH_2)$— / $CO_2$—i-$C_4H_9$ } | 9 | |
| $CH_3$ | $CH_3$ | H | $CH_3$ | 40 | 9.7 |
| $CH_3$ | $CH_3$ | $CH_3$ | $CH_3$ | 57 | 14.9 |
| $C_6H_5$ | H | $CH_3$ | $CH_3$ | 70 | 12.8 |
| $C_6H_5$ | H | $C_2H_5$ | $C_2H_5$ | 58 | 23.3 |
| $C_6H_5$ | H | $CH_3$ | $CH_3$ | 43 | |
| —$(CH_2)_4$— | | H | H | 31 | |
| —$(CH_2)_4$— | | H | $CH_3$ | 52 | 13.1 |
| —$(CH_2)_4$— | | H | $C_2H_5$ | 70 | 25.1 |
| —$(CH_2)_4$— | | $CH_3$ | $CH_3$ | 67 | 15.3 |
| —$(CH_2)_4$— | | $C_2H_5$ | $C_2H_5$ | 97 | 140.5 |
| —$(CH_2)_4$— | | H | $C_6H_5$ | 8 | |
| —$(CH_2)_4$— | | \multicolumn{2}{c|}{ —$(CH_2)_2$—N—$(CH_2)_2$— / $CO_2$—i-$C_4H_9$ } | 29 | 1.5 |
| —$(CH_2)_4$— | | \multicolumn{2}{c|}{ —$(CH_2)_2$—N—$(CH_2)_2$— / $CO_2$—$C_2H_5$ } | 32 | 1.9 |
| —$(CH_2)_4$— | H | \multicolumn{2}{c|}{ 3',4'-diO$CH_3$-benzyl } | 25 | 0.4 |
| —$(CH_2)_4$— | | \multicolumn{2}{c|}{ —$(CH_2)_2$—N—$(CH_2)_2$— / $CH_2CH_2OH$ } | 46 | 3.0 |
| —$(CH_2)_4$— | H | $CH_2CH_2OH$ | | 65 | 9.0 |
| —$(CH_2)_4$— | H | $CH_2CH_2N(C_2H_5)_2$ | | 18 | 0.8 |

What is claimed is:

1. The method of relaxing smooth muscle in a subject which comprises administering to the subject an effective amount of a compound selected from those of the formulae

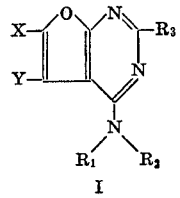

and

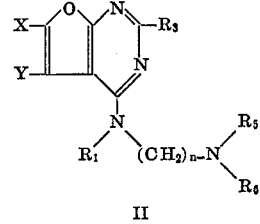

wherein
X and Y are each selected from the group consisting of hydrogen, alkyl containing up to 4 carbon atoms, phenyl, naphthyl and X and Y taken together, alkylene containing 3 or 4 carbon atoms, and benzo;
$R_1$ and $R_2$ are each selected from the group consisting of hydrogen, alkyl containing up to 6 carbon atoms, alkenyl containing up to 6 carbon atoms, phenyl, naphthyl, β-hydroxyethyl, and $R_1$ and $R_2$, when taken together, form a heterocycle selected from the group consisting of morpholino, thiomorpholino and piperazino, wherein said piperazino is substituted at the 4-position with a moiety selected from the group consisting of hydrogen, alkyl containing up to 6 carbon atoms, alkenyl containing up to 6 carbon atoms, phenyl and naphthyl;
$R_3$ is hydrogen or alkyl containing up to 6 carbon atoms;
$R_4$, $R_5$, and $R_6$ are each selected from the group consisting of hydrogen and alkyl containing up to 6 carbon atoms; and
n is an integer from 2 to 5;
and the pharmaceutically-acceptable salts thereof.

2. The method of claim 1 wherein said smooth muscle is bronchial tissue.

3. The method of claim 1 wherein said compound is of Formula I and $R_1$ and $R_2$ are each selected from the group consisting of hydrogen and alkyl containing up to 6 carbon atoms.

4. The method of claim 2 wherein said compound to be administered is 4-diethylamino-6-phenylfuro[2,3-d]pyrimidine.

5. The method of claim 2 wherein said compound to be administered is 4-ethylamino-5,6,7,8-tetrahydrobenzofuro[2,3-d]pyrimidine.

6. The method of claim 1 wherein said compound to be administered is 4-diethylamino-5,6,7,8-tetrahydrobenzo[2,3-d]pyrimidine.

7. The method of claim 2 wherein said compound to be administered is 4-amino-5,6,7,8-tetrahydrobenzofuro[2,3-d]pyrimidine.

8. The method of claim 2 wherein said compound to be administered is 4-dimethylamino-6-methylfuro[2,3-d]pyrimidine.

9. The method of claim 2 wherein said compound to be administered is 4-methylamino-6-methylfuro[2,3-d]pyrimidine.

10. A composition useful for relaxing smooth muscle which comprises an effective amount of 4-diethylamino-6-phenylfuro[2,3-d]pyrimidine or a pharmaceutically acceptable salt thereof and a pharmaceutically acceptable carrier.

11. A composition useful for relaxing smooth muscle which comprises an effective amount of 4-ethylamino-5,6,7,8-tetrahydrobenzofuro[2,3-d]pyrimidine or a pharmaceutically acceptable salt thereof and a pharmaceutically acceptable carrier.

12. A composition useful for relaxing smooth muscle which comprises an effective amount of 4-diethylamino-5,6,7,8-tetrahydrobenzo[2,3-d]pyrimidine or a pharmaceutically acceptable salt thereof and a pharmaceutically acceptable carrier.

References Cited

Geward, Berichte, 99, 1002–1007 (1966).

STANLEY J. FRIEDMAN, Primary Examiner

U.S. Cl. X.R.

260—256.4